(12) United States Patent
Matthews

(10) Patent No.: US 6,943,811 B2
(45) Date of Patent: Sep. 13, 2005

(54) APPARATUS AND METHOD OF MANAGING DATA OBJECTS

(76) Inventor: David J. Matthews, 54609 Bradley St., Elkhart, IN (US) 46514

( * ) Notice: Subject to any disclaimer, the term of this patent is extended or adjusted under 35 U.S.C. 154(b) by 4 days.

(21) Appl. No.: 10/392,922

(22) Filed: Mar. 21, 2003

(65) Prior Publication Data
US 2004/0109006 A1 Jun. 10, 2004

Related U.S. Application Data
(60) Provisional application No. 60/366,253, filed on Mar. 22, 2002.

(51) Int. Cl.[7] .................................................. G09G 5/02
(52) U.S. Cl. ...................................... 345/660; 345/684
(58) Field of Search ................................ 345/156–158, 345/660, 661, 667, 668, 684, 687, 782, 784, 785; 715/782, 784, 785

(56) References Cited

U.S. PATENT DOCUMENTS 5,686,940 A * 11/1997 Kuga .......................... 345/156
6,288,704 B1 * 9/2001 Flack et al. .................. 345/684

FOREIGN PATENT DOCUMENTS

JP          3-189683      *   8/1991

* cited by examiner

Primary Examiner—Matthew Luu
(74) Attorney, Agent, or Firm—Barnes & Thornburg LLP

(57) ABSTRACT

A computer-operated graphical content management interface is provided wherein a user can navigate to and view data objects by moving a perceived distance relative to the data objects, either closer to or farther from the user.

21 Claims, 4 Drawing Sheets

APPARATUS AND METHOD OF MANAGING DATA OBJECTS

RELATED APPLICATIONS

The present application is related to and claims priority to U.S. Provisional Patent Application, Ser. No. 60/366253, filed on Mar. 22, 2002, entitled "APPARATUS AND METHOD OF MANAGING DATA OBJECTS". The subject matter disclosed in that provisional application is hereby expressly incorporated into the present application.

APPENDIX

A CD-ROM is included with this specification as an Appendix. The Appendix includes a program titled "Main Program" which is one illustrative embodiment of the invention. Support files are included, one being titled "03-19-03-EDICT-template" and several others being contained in a "content" folder. In other embodiments of the invention, the inventive concept may be implemented in other computer code, in computer hardware, in other circuitry, in any combination thereof, or otherwise. The Appendix is hereby incorporated by reference in its entirety and is considered to be a part of the disclosure of this specification.

TECHNICAL FIELD

The present invention relates to management of information, and more particularly to an apparatus and method for accessing, displaying, arranging or otherwise managing data objects in a computing system.

BACKGROUND

Graphical display of information has become the preferred means of communication through a computer. For example, operating systems such as Apple's OS and Microsoft's Windows® are very graphics intensive, having the ability to display multiple stacked windows within the confines of the viewable space of a computer monitor. For information that extends beyond the boundaries of the display, scrolling is used to roll the information up or down to get the desired information into view. Applications, like word-processing programs, games, and image editing programs, can be displayed in stacks, with the application being used at the time being in the forefront, with the remaining applications stacked underneath. The applications that are unused merely remain below in the stack until the user brings one of them to the forefront to activate it.

These known techniques are used because the amount of viewable space on a monitor is limited relative to the number of tasks the computer can perform or amount of information it can display. Stacking and scrolling are efficiency means to allow more information available for display than what the monitor can display at any one time.

An enhancement to visually displaying large and varied amounts of information is to use the perception of depth by allowing the user to scale windows to the forefront, thereby increasing their size, for files that are intended for use. Conversely, the user can scale windows into the back, thereby decreasing their size, for files that are either not intended for use at the time, or are performing functions that do not require substantial space on the monitor for the user to view the window. By decreasing the size of the window by scaling it to the back, its presence can still be ascertained. The window now occupies only minimal space, leaving viewable space on the monitor for windows the user desires to place in the forefront. This system allows the user to visually manage windows on the computer without necessarily having to lose sight of any of them. This system is in contrast to mere magnification functions that exist in word-processing and drawing programs. These magnification functions only serve to increase the size of the document, or canvas, not the application itself. Also, these functions tend to incorporate Preset Scales 16, 33.3, 50, 67, 100, etc.

SUMMARY

The following disclosure provides, in one illustrative embodiment, a computer-operated layered graphical content management interface wherein a user can navigate to and view data objects by adjusting a perceived distance of the data objects, from the viewable space of a monitor, or other display device. In one embodiment, the layered graphical content management interface comprises a control layer, a zoom layer, and a pan layer. At least one data object is located on the pan layer. The pan layer is located on the zoom layer such that the data object can be viewed by the user by scaling the zoom layer to any perceived distance either closer to or farther from the user. The control layer provides for scaling of the zoom layer and for scrolling of the pan layer. The velocity of the scaling and scrolling is adjustable relative to the perceived distance the data object is from the user.

Another illustrative embodiment of the disclosure provides a graphical content management interface which comprises a zoom layer, a pan layer and a data object. The data object is located on the pan layer. The user navigates by scaling the zoom layer and scrolling the pan layer. Velocity of the scaling and scrolling varies relative to the perceived distance the data object is from the user.

In the above described and other embodiments, the interface may comprise: the velocity of scaling and scrolling being increased when the perceived distance between the data object and the user is large, and being decreased when the perceived distance between the data object and the user being small; a copy of the interface can be imported into itself to provide a plurality of pan layers; a pan layer being a perceived infinite space; a plurality of data objects can visibly blend with each other; input instructions from the user to the computer scales the zoom layer or scrolls the pan layer; velocity of scaling further comprises repositioning dependencies for providing navigation of the pan layer; repositioning dependencies comprise a distance of control adjustment wherein scaling initiated by an input device affects scaling rate of the pan layer, and a velocity of control adjustment wherein, in association with the distance of control adjustment, the velocity of the scaling being adjusted to compensate for the zoom layer's magnitude by defining a variable; a scaling rate of the pan layer being exponential; the variable being the product of an inverse ratio calculation of the zoom layer scale; velocity of scrolling further comprises pan layer repositioning dependencies for providing navigation of the pan layer; a distance of control adjustment wherein scrolling initiated by an input device affects a scrolling rate of the pan layer, a velocity of control adjustment in association with the distance of control adjustment, wherein the velocity of the scrolling being adjusted to compensate for the zoom layer's magnitude by defining a variable, and a scale of zoom wherein a pan increment modifies scrolling adjustments made to the pan layer based on the zoom layer's magnification; scrolling initiated by the input device moves at an exponential rate; the variable being the product of an inverse ratio calculation of the zoom layer scale; a pan increment which magnifies scrolling adjustments to the pan layer when the scale of the zoom layer is reduced, and reduces scrolling adjustments to the pan layer when the scale of the zoom layer increased; the data object being an executable program; a menu layer having zoom and scrolling functions located thereon and accessible to the user regardless of data object positioning; and a pan layer being a perceived infinite space.

Another illustrative embodiment provides content management interface which comprises a computer processor, a display, a background, and a data object. The processor determines what information is made visible on the display. The display defines a perceived bounded space. The background is displayed within the perceived bounded space of the display. The data object is scalable and scrollable across the perceived bounded space while the background remains stationary with respect to the bounded space.

In the above described and other embodiments, the interface may comprise: a velocity of the scaling and scrolling being adjustable relative to a perceived distance the data object is from the background; a data object being an executable program; the background being an image that remains stationary to the user with respect to the bounded space; a background comprising no image and that lack of image provides the perception that the background remains stationary to the user.

Another illustrative embodiment provides a method of managing information in a computer system which has a display device with a user-viewable area. The method comprises the steps of providing a pan layer, locating at least one data object and providing navigation tools. The pan layer has x and y dimensions, and at least a portion of the pan layer is viewable through the user-viewable area of the display device. In addition, at least one of the x and y dimensions is greater than user-viewable area of the display device. The data object is located on the pan layer. The navigation tools allow the user to adjust at least one of the x and y dimensions to view the pan layer. The navigation tools also position the data object in the user-viewable area of the display device.

In the above described and other embodiments, the interface may comprise the steps of: providing a z dimension to the pan layer; providing navigation tools to the user; providing a zoom function to allow the user to adjust a perceived distance in the z dimension to the at least one data object; providing a zoom layer to create a z dimension for the pan layer; providing a control layer to receive instructions from a user so as to control the portion of the pan layer which is viewable in the user-viewable area of the display device; locating a plurality of data objects on the pan layer; providing a scrolling feature to adjust at least one of the x and y dimensions wherein an associated scrolling velocity is variable, and the scrolling velocity varies in proportion to distance in the x or y dimensions between the data object and the user viewable area; and providing a z dimension to the pan layer wherein an associated zoom velocity is variable, and wherein the zoom velocity varies in proportion to distance in the z dimension between the data object and the user viewable area.

Additional features and advantages of the method and apparatus will become apparent to those skilled in the art upon consideration of the following detailed description of the illustrated embodiment exemplifying the best mode of carrying out the gripper assembly as presently perceived.

BRIEF DESCRIPTION OF THE DRAWINGS

An illustrative embodiment of the invention will be described hereafter with reference to the attached drawings which are given as non-limiting examples only, in which.

Corresponding reference characters indicate corresponding parts throughout the several views. The exemplification set out herein illustrates embodiments of the apparatus and method, and such exemplification is not to be construed as limiting the scope of the apparatus and method in any manner.

DETAILED DESCRIPTION

The illustrative apparatus and method provides a content management system for presenting a virtually limitless amount of simultaneously displayed electronically viewable information within the confines of a limited viewing area. It is contemplated that the apparatus is a computer program, operating system, or browser that, in conjunction with a central processing unit, controls how content is viewed by a user. It is further contemplated that, in one illustrative embodiment, the program or operating system will display any amount of content on a base or pan layer, and that the content can be viewed within a limited viewing area by affecting the apparent distance of that content from the user. An example of an illustrative embodiment is contained in the file "Main Program" on the CD-Rom included in the Appendix.

The illustrative apparatus and method provides controls for navigating the viewing area. It is contemplated that the method of navigating will allow the user to selectively view a plurality of data objects simultaneously to confirm the existence of, or browse such plurality of data objects by moving the apparent distance of the user farther away from the pan layer. In contrast, the method of navigating will also allow the user to selectively examine a single data object from the plurality of data objects by moving the apparent distance of the user closer to the pan layer.

Figure 1:
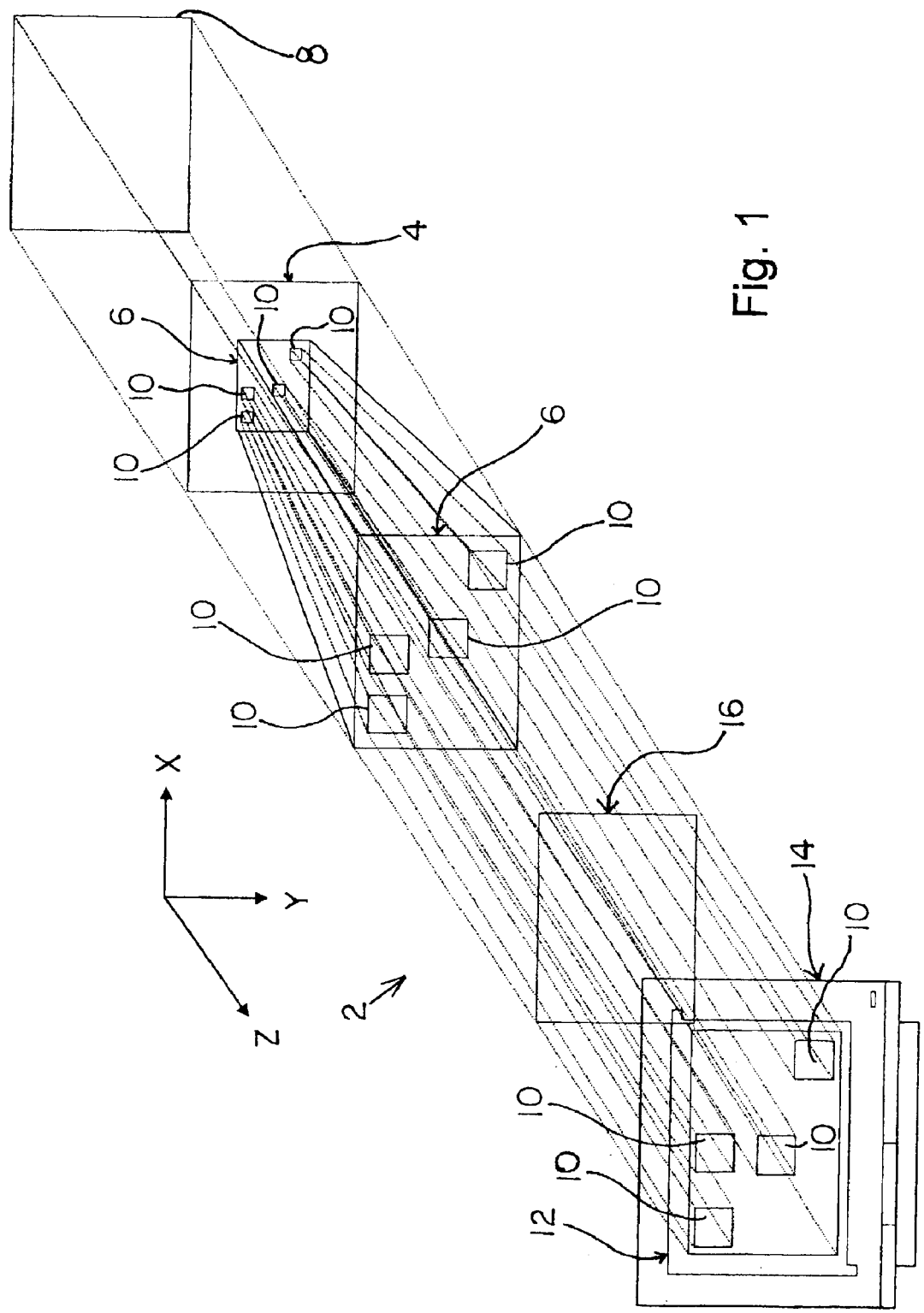
FIG. 1 is an exploded graphical representation of an illustrative embodiment of a perceived multi-dimensional space having a viewable area confined by a display device.

An illustrative embodiment of apparatus 2 is shown in FIGS. 1 through 4. One illustrative embodiment of the apparatus 2, as shown in FIG. 1, comprises a zoom layer 4, a pan layer 6, and a control layer 8. An embodiment of the apparatus also comprises a menu layer 16. The pan layer 6 is illustratively located on zoom layer 4, such that content or data objects 10 on pan layer 6 can be viewed from any perceived distance via scale adjustments made to the zoom layer 4. The data objects 10 are visible within the confined viewable area 12 of a monitor 14. Scaling determines what the size of data object 10 will be with respect to the display device. The control layer 8 comprises functionality for the interaction and movement of zoom and pan layers 4 and 6, respectively. The zoom layer 4, pursuant to functionality provided by the control layer 8, allows control of the perceived distance of the user from the pan layer 6. The pan layer 6 is a space which can be large, as perceived by the user, and may in certain embodiments be perceived as infinitely large. Pan layer 6 resides on zoom layer 4. Pan layer 6 extends beyond the boundaries of the viewable area 12. The data object(s) 10 can reside directly on pan layer 6, or be nested in its own content layer which itself can reside on pan layer 6. Pursuant to the functionality provided by control layer 8, the pan layer 6 can be given the perception of movement in any direction so that the user may scale in or enlarge a single data object 10 (see FIG. 3), or scale out to shrink the data object 10 and/or to observe a plurality of data objects 10 (see FIG. 1).

Figure 2:
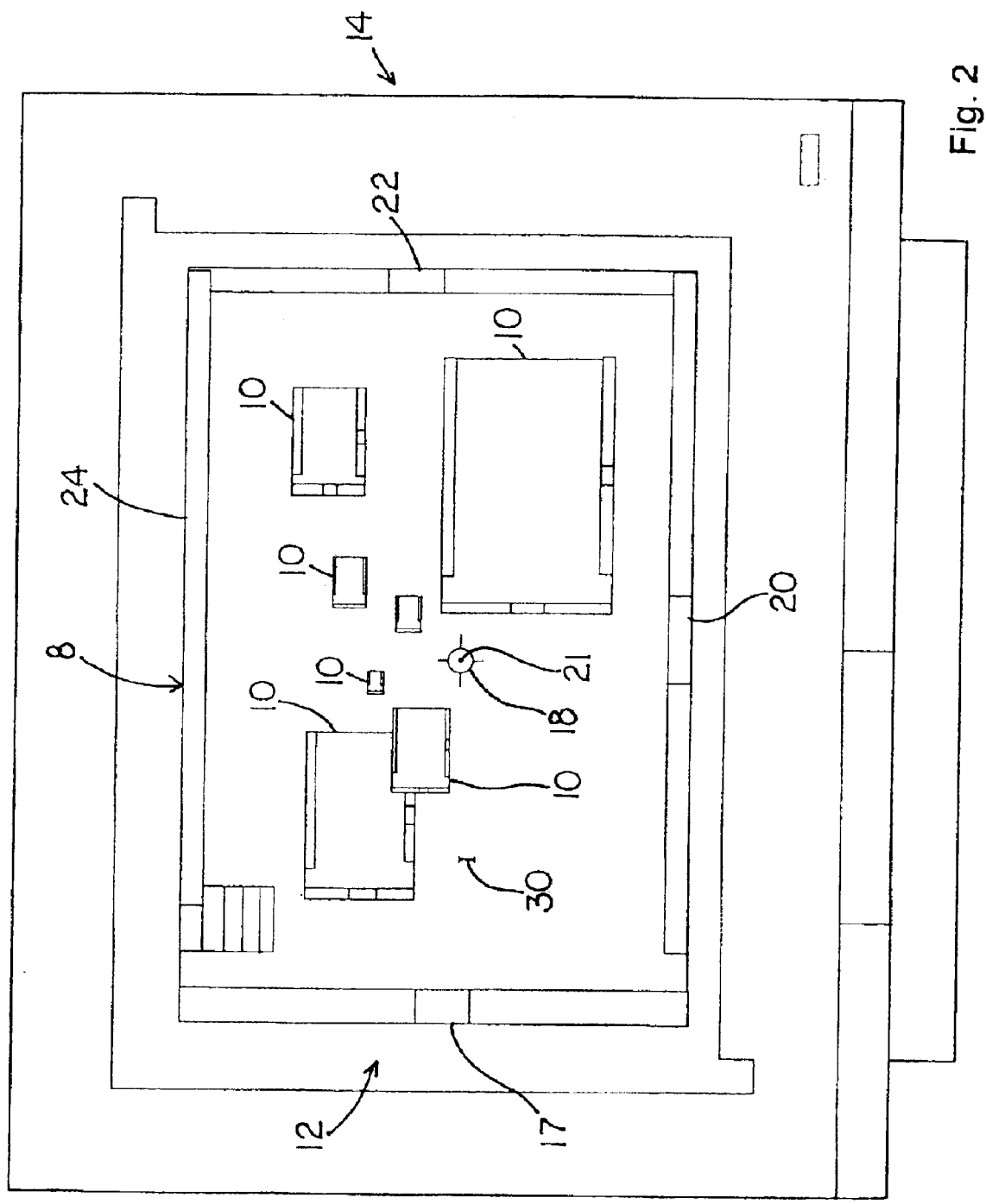
FIG. 2 is an illustrative user view of the perceived multi-dimensional space of the type shown in FIG. 1.

Menu layer 16 illustratively resides in front of pan layer 6 to provide enhanced navigation of the apparatus independent of the control layer 8. In one illustrative embodiment, as shown in FIG. 2, menu layer 16 provides functionality in the form of menus that assist the user in navigating to the data objects 10. In this illustrative embodiment, the menu layer 16 remains on the user's viewable area 12 regardless of the positioning of the data objects 10. Menu layer 16 may provide a drop-down menu that provides the user with navigation, preferences, help, and merge field functions, for example.

Also shown in FIG. 2 is a plurality of data objects 10 located at perceived various distances from the face of the viewable area 12. Any portion of the viewable area 12 can be scaled to make any of the data objects 10 appear either large or small. In this illustrative embodiment, a scale control 17 can be used to scale any part of the viewable area 12 in which the location is controlled by a scaling target 18. The scaling target 18 is illustratively movable to any location on the viewable area 12. The scale control 17 selectively increases or decreases the size of any data objects within the viewable area 12 and from any point defined by scaling target 18. Illustratively, target 18 can be moved to a data object 10 and then the scale control 17 can be used to increase that data object 10 to the desired size. Movement of the scale of data objects 10 allows the content therein to be either used or placed in the background. Further navigation can be accomplished by using scrolling controls 20, 22. Scrolling control 20 illustratively enables panning of content in the x-direction, whereas scrolling control 22 illustratively enables panning of content in the y-direction. It is contemplated that such scaling and scrolling controls can be input from other sources, such as buttons or a mouse.

Figure 3:
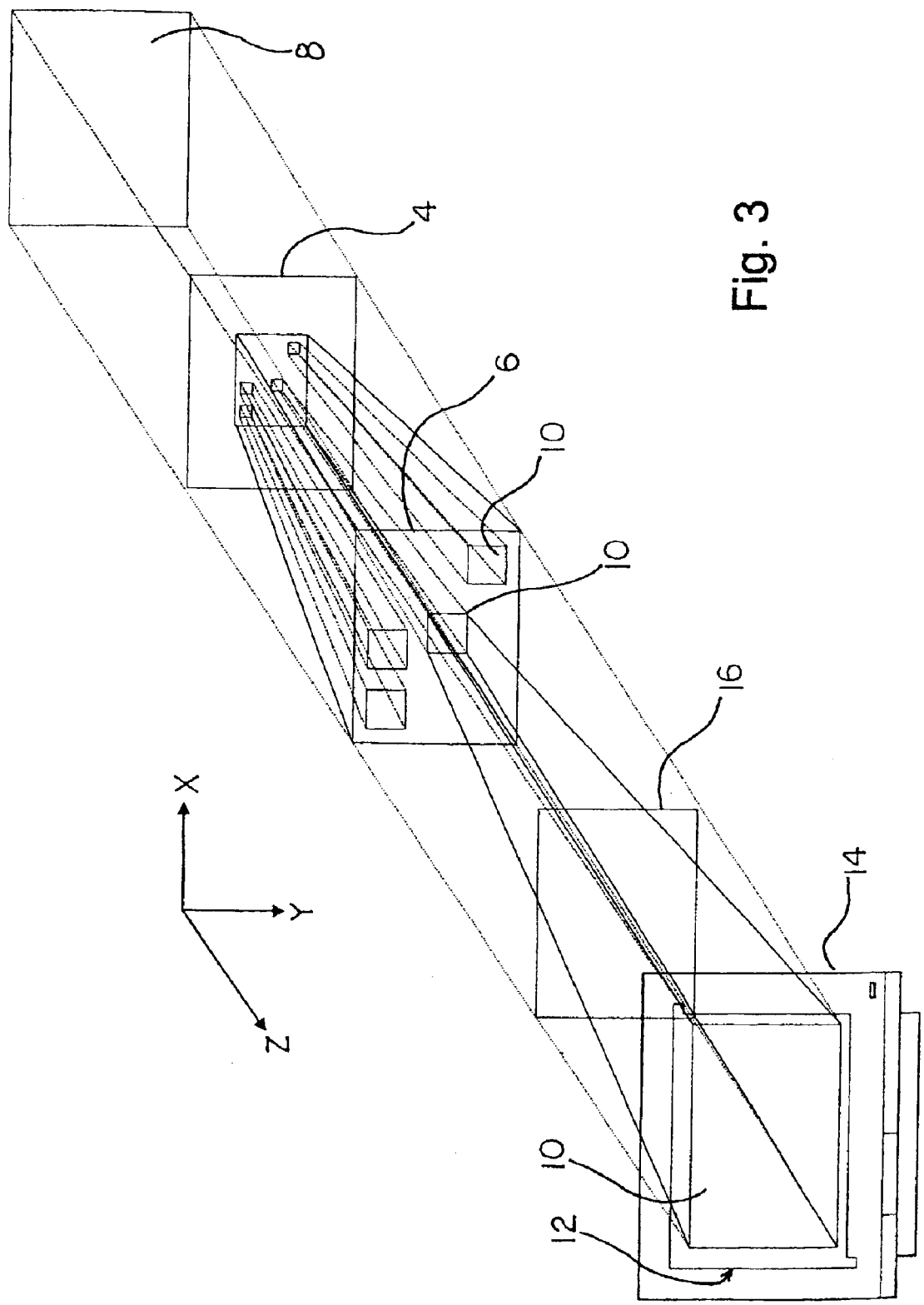
FIG. 3 is an exploded graphical representation of the perceived multi-dimensional space of FIG. 1 having a data object scaled to the forefront of the display device.
Figure 4:
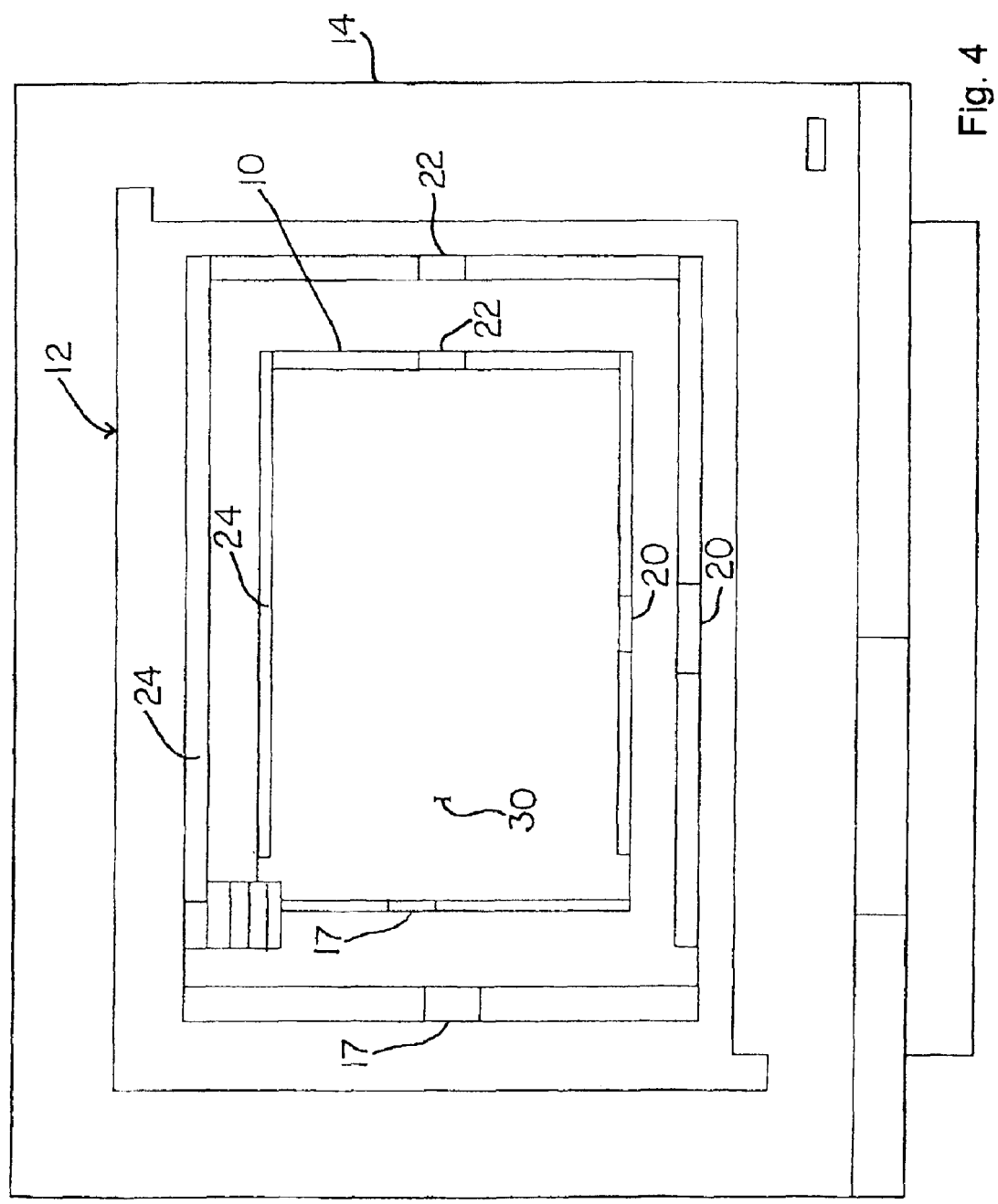
FIG. 4 is an illustrative user view of the perceived multi-dimensional space of the type shown in FIG. 3.

Movement of the data objects 10 on the pan layer, which is on zoom layer 4, can be magnified to a desired size as shown in FIGS. 3 and 4. Scaling zoom layer 4 in reverse will cause the size of data object 10 to be reduced, thereby allowing other data objects 10 to become visible within viewable area 12.

It is contemplated that this method and apparatus may be developed in various authoring programs such as Macromedia's "Flash" and/or program languages, including Windows®, ASP, SQL, Apple OS, HTML, Java, JavaScript, Perl, MYSQL, XML, C+, C++, and others. The computer that implements the method and apparatus can be of conventional type, like a desktop, laptop, or similar type computer, having a display monitor. It is further contemplated, however, that such a method and apparatus can be used on any device having a processor and a display, such as a cell phone, gaming console, personal data assistant, vehicle, hologram or screen projectors, audio/visual equipment, and monitoring devices.

Object Layer Hierarchy

A plurality of layers, limited only by the capacities of the host system resources (e.g., a computer) may be contained in an individual, addressable object layer hierarchy. It is appreciated that a plurality of these data objects may be placed upon a content layer, which can illustratively reside on and be contained by the zoom and pan layers 4 and 6, respectively. This can, thus, allow for a plurality of nested multi-dimensional, seemingly infinite spaces.

Screen resolution settings of the display device 14 illustratively establish a base reference of 100% in relation to which zoom layer 4 and pan layer 6 position adjustments are made. It is contemplated that as the display device quality varies, the apparatus will automatically compensate for and become less burdensome on lesser host system monitors and their more limited video display rewrite capacities. For example, reducing the hardware defined display screen resolution on any system significantly reduces the processor load.

Control Layer

Apparent point of view adjustments within the displayed environment are managed by controls which allow a user to adjust both the direction and speed of pan layer 6 x,y scrolling and/or zoom layer 4 scaling. The control layer 8 is generally not visible to the user. Zoom and pan layers 4 and 6 are discussed further herein, but their control and navigation by control layer 8 is consistent throughout the entire space. Control layer 8 receives input instructions from, illustratively, press-slide-release action of the computer mouse button, or keyboard keys controlled by the user, which moves the zoom and pan layers 4 and 6 pursuant to these input instructions. It is appreciated, however, that the control layer 8 may accept input from other sources as well, such as a remote control, personal digital assistants, portable communication devices, consumer electronics, another computer, etc.

Movement of pan layer 6 may, illustratively, be controlled by a single press, hold and slide of the mouse button, such that the slide of the mouse moves the layer or a cursor on the layer along the x,y direction of same. It is contemplated that releasing the mouse button will stop movement about the layer, readying control layer 8 for the next input instructions. In addition, the mouse may slide to establish direction and exponentially adjust scrolling speed, including reverse, wherein movement of longer distances result in exponentially greater or lesser pan layer 6 movement speeds. Furthermore, an illustrative single press, hold and slide of the mouse button can maintain a constant rate of continuous horizontal and/or vertical pan layer 6 repositioning.

Similarly, movement of zoom layer 4 may, illustratively, be controlled by a double press, hold and slide of the mouse button with the slide of the mouse moving the control layer illustratively up or down resulting in the zoom direction moving inward or outward of the zoom layer 4. (Compare FIGS. 1 and 3.) It is contemplated that releasing the mouse button will stop movement, readying the control layer for its next input instructions. In addition, sliding the mouse can exponentially adjust zooming or panning speed. Specifically, moving the cursor on the control layer 8 longer distances may result in exponentially greater or lesser zoom layer 4 or pan layer 6 movement speeds, as desired. Furthermore, a double press slide and holding of the depressed mouse button at any location other than the start position can maintain a constant rate of continuous scaling inward and outward of the zoom layer 4.

This method of two-dimensional manipulation, applied to two separate interactive and controlled layers, each of which may be addressed individually or in unison, using only common x,y position adjustments to the pan layer 6 and/or scale adjustments to the zoom layer 4, defines an apparent three-dimensional environment. This becomes an efficient method of presenting such an environment for low power computers since true three-dimensional modeling is not required.

Zoom Layer

The zoom layer 4 may be scaled from zero to an exponentially large size (along the z axis), and is normally centered in a stable position within the viewable display area. Illustratively, scale adjustments are controlled by initiating changes of scale equally to the x and y axes of the zoom layer, which also scales the contained pan layer 6 and its contained content. The center point of the zoom layer may be located at any point on the overall x,y grid. Illustratively, however, it can be assumed that the center point of the scaling of zoom layer 4 is in the center of the display device. (See, e.g., reference numeral 21 in FIG. 2.) When the center point of the zoom layer 4 is located off center, the effect is such that scaling in and out of the displayed environment results in the content moving sideways in and out of the viewable area 12.

In one illustrative embodiment of the disclosure, the apparatus may have a 1% to 29,000% zoom/pan layer scale adjustment range. This illustrative limitation is imposed by current realtime hardware processing limitations as they relate to the computational time costs of exponentially manipulating the scale of the zoom layer 4 and its contained pan layer 6 along with the pan layer's 6 contained content beyond an arbitrary point. In other words, the products of the calculations become so large they clog the buffers in the CPU, causing the host system to drop integers, resulting in unsatisfactory interface response to user input. The default scale of this apparatus is illustratively 100%, and approximately fills the display area of the display device or at least a portion of that display device 14. This is typically 640×480 virtual pixels through about 1600×1200 virtual pixels; smaller devices may offer a lesser pixel density and vise versa for larger displays.

The illustrative embodiment sets minimum and maximum numerical boundaries for the zoom layer 4 scale adjustment function at 1% as the smallest scale managed and 29,000% as the largest scale allowed before "automatic roll over scale reset" to the opposite end of the scaling function occurs. The automatic roll over may be superceded by stops at either or both ends of the scaling function.

For example, using 800×600 pixels as a reference example for typical screen resolution virtual pixel density, 100% of the screen would be 800×600 pixels. Illustratively, a 1% zoom layer 4 scale shows a 100×100 data objects 10 at 800×600 pixels per data object or 10,000 data objects 10 represented within the viewable display area when this apparatus is scaled out to its apparently most distant and expansive inspection state, so that the user is apparently farther from the viewed field. This would, illustratively, be 100 data objects 10 horizontally times 100 data objects 10 vertically, with each data object representation area being 800×600 pixels at 100% scale, placed edge to edge. It is appreciated that wider spacing compensates for the possibility of limited host system resources by reducing the number of data objects 10 on viewable area 12 at any scale level.

Accordingly, if each data object 10 contains an array of 100×100 similar data objects 10 at 100% scale, a single 800×600 pixel data object 10 would contain 10,000 8×6 pixel data objects, each of which would occupy the entire viewed screen at a 10,000% scale level. This is equal to 100,000,000 fully scaleable, viewable, and accessible data objects 10, each of which may be scaled up to 100% of the viewable display screen resolution setting, and each of which may be scaled an additional 290% (10,000% scaled to 29,000%) for more detailed inspection by the user. Accordingly, it is appreciated that the apparatus accommodates 100,000,000 data objects 10 within the original virtual 800×600 virtual pixel full display screen space of the primary zoom scaling system, based upon a 100% screen resolution of 800×600 virtual pixels.

Additionally, the illustrative embodiment may contain copies of itself recursively and each of those 100,000,000 data objects 10 may contain a copy of the apparatus 2 as a data object 10 which, therefore, may potentially contain and fully display 100,000,000 separate data objects 10 within the original 800×600 virtual pixel dimensions of the display device 14. This results in 10,000,000,000,000,000 fully accessible, full screen viewable and interactively available data objects 10 at one level of recursive self-import within the bounds of the original 800×600 resolution screen. Adding levels of recursive inclusion within this system results in exponential increases in the potential density and number of full screen data objects 10 which may be displayed within the bounds of the original 800×600 virtual pixel display area 12.

Pan Layer

The two-dimensional pan layer (x,y axes) 6 is illustratively a sub-object of, and is contained by, the zoom layer 4. On the programming tree hierarchy, as shown in FIGS. 1 and 3, the pan layer 6 is located over the zoom layer 4, and is thereby positioned closer to the user in a mechanical sense than the zoom layer 4. This is because the surface of the pan layer 6 also contains the interactive content for the user to manipulate via standard or yet to be invented systems, such as a mouse or buttons, for example. The pan layer 6 and its data objects 10 located thereon slide horizontally and vertically upon the zoom layer 4 in response to user input instructions. Portions of the pan layer 6 and the zoom layer 4 that are located "off-screen" may be transparent to the apparatus, i.e., the system will draw only that section of the zoom and pan layers 4, 6, which are within the viewable area 12 of the display device 14. Again, this reduces host system processing requirements substantially such that the pan layer object may be of virtually infinite size without significantly increasing the realtime processing demands.

The pan layer's 6 center target 21 may be repositioned vertically and/or horizontally along any of the four +/−x,y axes of the zoom layer 4. The center target 21 may be repositioned along a combination of the vertical and horizontal positions on the zoom layer 4, from x=0/y=0 on the zoom layer 4, out to an infinite point on any axis of the zoom layer 4. This allows the center point of the zoom layer 4 to access a virtually unlimited number of additional "whole" data objects 10 on the pan layer 6, with a theoretical and actual content density equal to the content density detailed above as 100% of the viewable area.

Pan Control

The pan control is a primary point of interaction between the user and the discussed embodiment of the method and apparatus. The pan control is, illustratively, a virtual plane software object which is located in the control layer 8 of this apparatus. In one illustrative embodiment, the direction of pan layer repositioning is the opposite of control movement direction. Attempting to maintain cursor 30 position over any point on the moving pan layer 6 during navigation, by initiating actions from the screen center, tends to guide that point towards the center of the zoom layer 4. Accordingly, when a targeted data object 10 is located in the center of the viewed area, attempts to maintain cursor focus and location over that targeted data object 10 would progressively require fewer and smaller movements by the user. An embodiment of the pan control comprises a triple dependency to establish how it will operate relative to user input and positioning of the pan layer.

Triple Dependency of Pan Layer Repositioning Calculations

The repositioning calculations needed to navigate on the pan layer 6 in an intuitive manner are based on the distance and direction from the start position of control layer 8 adjustment, the velocity of pan layer 6 adjustment is based upon the scale of zoom layer 4 and the distance of mouse drag from the starting point (for speed). These three factors determine how the apparatus 2 will react in response to user input. Such interdependency simplifies the navigation of the apparatus 2 since user input can be limited. In many cases, the strokes of the mouse along a distance no larger than a mouse pad is often the extent of user input available for navigating within a space depicted by a display device.

Issues surrounding intuitive navigation manifest themselves when comparing the movement of data object 10 when the user is viewing the object at close or distant range. Illustratively, if the object is at a scale of 100%, filling the viewable area, it would be contemplated that moving the mouse some distance in the x,y plane along an average size of the mouse pad will move the data object 10 or cursor 30 an approximately equivalent distance on display device 14. That distance might only be the width of the data object 10 itself. If, however, the zoom was at a far distance from the data object 10 (e.g., 1%) wherein the object 10 was viewable on only a small portion of the viewable area, moving the mouse the same distance as was done when the object was at 100% would move the data object or cursor an insignificant distance. Rather, the movement of the mouse should move the object or cursor 30 a proportional distance along a portion of the entire pan layer visible in the display device, not merely the width of the data object 10 itself.

Accordingly, the apparatus compensates for this limited ability to input, and provides an intuitive manner of navigation through the following dependencies.

a. Distance of Control Adjustment

The pan layer x,y position adjustment occurs on an automatic basis when the control is activated. Moving or dragging the input device like a mouse a greater distance increases or decreases the rate of pan layer 6 repositioning exponentially depending on the direction of movement. The ratio of exponential rate increase or decrease may be adjusted independently for greater or lesser sensitivity to end user/viewer inputs.

b. Velocity of Control Adjustment

When horizontal or vertical adjustment of the pan layer 6 is initiated, the actual and apparent velocity of the pan layer's 6 horizontal and/or vertical movement is adjusted to compensate for the magnitude of the zoom layer 4 by defining a variable which is the product of an inverse ratio calculation of the zoom layer 4 scale. The variable is larger when the zoom layer 4 is smaller, and smaller when the zoom layer 4 is scaled to a larger size.

c. Scale of Zoom Layer

A "pan increment" is used during pan layer 6 repositioning calculations to magnify x,y position adjustments made to the pan layer 6 when the zoom layer 4 is smaller and apparently farther from the user, or to diminish x,y position adjustments made to the pan layer 6 when the zoom layer 4 is larger and apparently closer to user. Illustratively, the impact of the "pan increment" may be adjusted for sensitivity by independent input from the user. In other words, repositioning the pan layer 6 at exponentially greater speeds gives the perception of larger horizontal and vertical movement when the zoom layer 4 is set to smaller scales, i.e., the apparatus is "scaled farther out." In contrast, repositioning the pan layer 6 at exponentially slower speeds gives the perception of smaller movement when the zoom layer 4 is set to a larger scale, i.e., "scaled in closer." Inclusion of the "pan increment" in pan layer 6 repositioning calculations exponentially adjusts the actual rate of pan layer x,y adjustments as well as apparent horizontal and vertical distances of movement in response to corresponding user input.

This use of scaling of the zoom layer 4 and scrolling of the pan layer 6 creates the perspective of an apparently infinitely large, apparently hyperbolic, and apparently three-dimensional space. This method of navigation provides a seemingly infinite number of potential vanishing points upon the pan layer 6, each of which may be centered on the zoom layer 4 for closer inspection via the scaling function.

Pan Control Operations

An illustrative embodiment of the pan control operation includes a "one button" input system. This system employs a timed sequence of "press/release/press and hold" method to access the zoom layer 4 rescaling when the sequence is executed within an adjustable, but limited, time period. For example, pressing and holding the mouse button down, then sliding same moves the cursor (which is illustratively locked to the control layer on press) to pan greater distances. Holding the mouse in a stable position after initial movement maintains steady and constant speed of pan layer 6 movement along the +/−x,y axes of the zoom layer 4. Releasing the mouse button will stop the movement of the pan layer 6. Conversely, on the previous release, pressing the button rapidly and holding the button down, then dragging vertically sets the zoom speed. Holding the position of the mouse in a stable position maintains the speed of the zoom. Releasing the mouse button stops the zoom. Alternatively, pressing the button, releasing, then pressing rapidly again (i.e., double click and hold) along with dragging the mouse vertically illustratively sets the scaling speed while moving cursor 30. Holding the position of cursor 30 in a stable position, again, maintains the speed of scaling. And again, releasing the button stops movement of the scaling action.

The pan control system is, illustratively, based on code loop-based actions which execute as individual software code loops which are initiated by inputs, i.e., one button on the display screen. The input either triggers or stops one of two different code loops, the pan loop "sts," or the zoom loop "zst," based upon the time lag between a release event and the next down press event of the mouse cursor button. The pan control may comprise of a button object which executes programming code loops in response to input, e.g., a mouse button "down press" and "drag," as previously described. An illustrative description of the code sequences of control layer 8 are as follows:

>On (Roll Over)

when the cursor is over the "hit" area of the button (the entire visible screen area is the "hit" area of the button);

>Stop Drag global stop for all previous drag operations, this is a preemptive command, compensating for potential carry over drag operations from any untracked software objects;

>Set Property (High Quality)="1"

global quality setting, preemptively setting default video quality to best state since no zoom or pan movement is being called for via user input;

>Set Variable: ". . . /:pani"=GetProperty(". . . /tzmr",_xscale)*.1 sets variable "pani" (pan increment) to a percentage of zoom layer 4 scale, 10% in this example, this percentage may be adjusted independently to change the sensitivity of the system to input as it affects pan layer 6 rates of movement in relation to inputs (dragging this button software object); changes in this variable tend to have exponential impact on interface response to input;

>Set Property ("", X Position)=0 sets default button x-position to 0; the "" refers to this button object;

>Set Property ("", Y Position)=0
sets default button y-position to 0; the "" refers to this button object;
>Begin Tell Target (". . . /spot")
>Goto and Stop ("h")
>End Tell Target
tells software object ". . . /spot" (zoom hint/que or pan state target=spot), which resides on a layer above the zoom and pan layers 6 (where it is visible on the user's front side of the content) to goto frame label "h" (hide spot), which is blank, thus, removing the interface response "pan target" and/or "zoom que" (e.g., illustratively, a red center spot, or center target 21, which appears during pan activity, and illustratively, a blue fade dot for zoom);
>Goto and Stop ("ph")
sends this section of code to frame label "ph" (pan hold), which stops all code execution loops for this button software object;
>End On
this ends the "onRollOver" actions assigned to the pan control button software object; focus is now idle and this software system consumes no CPU cycles, leaving full system resources available for video rewrites or any other type of host system activities; cursor 30 movements may cause focus to be usurped by the content and/or return focus to this pan control; each time the cursor returns to an area of the interface where this button is "visible to the cursor," the preceding "onRollOver" event is executed;
>On (Press)
when mouse button is depressed, if cursor is over "hit area" of the pan control;
>Start Drag ("")
tells this software button object "" to lock its x,y axis positions in relation to the on screen cursor 30 at that point on this button software object which coincides with the position of the cursor 30 at the instant the down press of the end user controlled input system (such as a mouse button, touch pad, joystick, etc.); additionally, to maintain this button software object's relative position, as it may vary, to coincide exactly with the original mouse cursor 30 position during the initial down press of the mouse button (input), and reset this button software object's x,y axis position to remain in the same relative position in relation to the cursor 30, even if the cursor moves from one loop through another;
>Set Property (High quality)="0"
tells system to reduce processing efforts dedicated to managing the quality of screen redraws while zoom layer 4 resealing loop or pan layer 6 repositioning loop is active;
>Begin Tell Target (". . . /spot")
>Goto and Stop ("p")
tells software object "spot," which resides on a layer above the zoom and pan layers 4, 6, to goto frame label "p" (pan target), which is illustratively, center target 21 (see FIG. 2), which shows during "button down" pan activity;
>End Tell Target
returns focus to this main section of this code;
>Set Variable: "bd1"=GetTimer
sets variable "bd1" (button down 1) to a number supplied by the system clock in milliseconds;
>If (bd1−bu1<tb)
if variable "bd1" (button down 1) minus variable "bu1" (button up) which occurs on the "release cycle" of this button software object code set, is less than the variable "tb" (time base) then;

>Begin Tell Target (". . . /spot")
>Goto and Stop ("z")
tell the software object "spot," one level up ( . . . /), to goto frame "z," which shows the "zoom que"=fade center target 21 to display once;
>End Tell Target
returns focus to this main section of this code;
>Goto and Play ("zst")
sends focus of this software object to frame label "zst" (zoom loop start); note that if the "if statement" measuring the time between the release and down click event represents a small enough time variation, the code on frame "zst" begins to execute; focus is now transferred to a code loop based in frame "zst": "zst frame-based code loop:
>Set Variable: "bp"=GetProperty(". . . /bp", _y)
sets a variable "bp" (button position) based upon the present y position of the software object one level higher in this code structure ( . . . /) (in screen resolution based pixels), which is being dragged and repositioned by the mouse cursor 30 because the mouse button is still depressed; this establishes the present position of the pan control system button object, located one level higher in the code, as that position varies, in response to end user input (drag), from the default start position, which is set "onRollOver" and "onRollOff" in this button software object as x=0 and y=0;
>Set Variable: "ps"=GetProperty(". . . /tzmr", _xscale)
sets a variable "ps" (present scale), based upon the present x scale of zoom layer 4;
>Set Variable: "sen"=1600/ps
sets a variable "sen" (sensitivity) by dividing the "ps" (present scale) variable into an arbitrary number, 1600 in this example; this number may be defined by an user-adjusted variable to control interface response to button drag movements as they may affect the rate of zoom per code loop; this calculation results in a quotient which diminishes as the scale of the zoom layer 4 becomes larger, and increases as the scale of the zoom layer 4 decreases;
>Set Variable: "zad"=bp/sen
sets a variable "zad" (zoom add) which divides the "sen" variable into the "bp" variable; this calculation results in a quotient which varies in relation to the distance of user-adjusted cursor movement, and is also adjusted to compensate for the scale of the zoom layer 4; as the zoom/pan object layer's scale becomes greater, the "sensitivity" variable collapses yielding a smaller number which is then divided into the "present button position" variable, deriving a quotient which becomes smaller as zoom scale increases, thus diminishing scale enhancements for any given button position as zoom layer 4 scales increase; repositioning the control button object a greater distance from the start position establishes a larger +/−"present button position" variable into which the "sensitivity" variable is divided, i.e.; the greater the distance the button object position is from zero, the larger the increment of adjustment becomes, still becoming incrementally smaller as the scale of the zoom layer goes up; the opposite occurs should the cursor be moved in an opposite direction from the x=0/y=0 starting point;
>Set Variable: "ps"=GetProperty(". . . /tzmr", _xscale)
sets a variable "ps" (present scale) of the zoom layer;
>Set Variable: "ns"=ps−zad
sets a variable "ns" (new scale) which is the next scale setting for the zoom layer 4; this subtraction causes upward slide action to increase zoom, pan layer scale, while downward drag results in lesser zoom, pan layer scale adjustments; reversing minus sign to a plus sign in the equation causes the reactions of the interface to move in the opposite direction in response to user input;

>Set Property (". . . /tzmr", X Scale)=ns
sets the x scale property of the zoom layer 4 one level higher in this code structure to a number defined by the "ns" variable;

>Set Property (". . . /tzmr", Y Scale)=ns
sets the y scale property of the zoom layer 4 one level higher in this code structure to a number defined by the "ns" variable;

>Play
tells the code loop to proceed to the next line of code; this "play action" could also be changed to "goto next frame," or "goto next line of code," etc.;

>End If
exits this "if loop" and returns code execution to the main sequence of this software object if the time between a button release event and subsequent down press is longer than the time frame established by this "if" calculation or, if the mouse button is still depressed;

>Play
tells this code loop to proceed to the next line of code; this "play action" could also be changed to "goto next frame" or "goto next line of code," etc.; this results in the next line of code, located in the frame labeled "sts" being executed if the previous "if statement" of this button is not met, focus is now transferred to code based in frame "zst" plus one (this is the same as the "goto next line of code"):

>If (ns>28000)
  Set Property (". . . /tzmr", X Scale)=1
  Set Property (". . . /tzmr", Y Scale)=1
>Else If (ns<=1)
  Set Property (". . . /tzmr", X Scale)=29000
  Set Property (". . . /tzmr", Y Scale)=29000
>End If this "if/else" conditional statement examines the actual scale of the zoom layer and sets that scale to 1% if the zoom layer 4 scale is greater than 29,000%, and sets the zoom layer 4 scale to 29,000% if the actual scale of the zoom layer 4 is less than or equal to 1%, based upon the "ns" variable;

>Goto and Play ("zst")
this line of code essentially returns focus to the previous frame labeled "zst" and is a "repeat this loop" function, causing a loop which continues to execute as long as the mouse button is in the depressed position, or if the "scaling function" has not been called because the time lag between a mouse button release event and subsequent additional rapid depression of the mouse button is too long; Focus is now transferred to code based in frame "sts" which begins the "pan actions loop":

>Begin Tell Target (". . . /bp")
tells the target software object one level up in the code ( . . . /bp) to execute the following set of instructions;

>Set Variable: "cx"=GetProperty("bp", _x)/pani
sets a variable "cx"(current x position of this button object which is being dragged by the cursor), because the mouse button is still depressed; the x position of the button object is then divided by the "pani" (pan increment), producing a quotient which is enhanced or diminished based on the scale of the zoom layer 4; the x position of the button object is returned in "pixels," based upon the video display screen resolution settings of the host machine; the default position of this button object is x=0/y=0 and is reset every time the button is released or rolled over;

>Set Variable: "cy"=GetProperty("bp", _y)/pani
sets a variable "cy" (current y position of this button object which is being dragged by the cursor), because the mouse button is still depressed; the y position of this button object is then divided by the "pani" (pan increment), producing a quotient which is enhanced or diminished based on the scale of the zoom layer 4; the y position of the button object is returned in "pixels," based upon the display device's screen resolution settings of the host machine; the default button object x position zero and is reset every time the button is released;

>Set Variable: "mapx"=GetProperty("tzmr/tmap", _x)
sets a variable based on the present x position of the pan layer 6;

>Set Variable: "mapy"=GetProperty("tzmr/tmap", _y)
sets a variable based on the present y position of the pan layer 6;

>Set Property ("tzmr/tmap", X Position)=mapx-cx
sets the x axis position property of the pan layer on the zoom layer 4 to a new x coordinate based on a calculation subtracting the "cx" variable from the "mapx" variable; because the grid for the apparatus establishes the x axis to be positive to the right hand side, and negative to the left hand side, the new x coordinate moves the pan layer 6 in a direction opposite of the direction the cursor is moved;

>Set Property ("tzmr/tmap", Y Position)=mapy-cy
sets the y axis position property of the pan layer to a new y coordinate, based on a calculation subtracting the "cy" variable from the "mapy" variable; because the grid for the apparatus establishes the y axis to be positive below the center of the viewed screen, and negative above the center of the viewed screen, the new y coordinate moves the pan layer 6 in a direction opposite of the direction the cursor is moved;

>End Tell Target
this ends one complete "pan actions loop";

>Play
play is the same as "goto the next line of code," which in this case resides on the next frame; focus is now transferred to code based in frame "sts" plus one frame;

>Goto and Play ("sts")
this sends focus back to frame label "sts" above; this is essentially the "loop function" and repeats the previous loop until the mouse cursor 30 control button is released;

>End On
end of this code section when the mouse button is released; the next lines of code begin when either the scale or pan functions cease (which were executed in a continuous loop until the mouse button is released);

>On (Release, Release Outside, Roll Out)
when the system registers a mouse button release action anytime after a "mouse button down" event, even if the cursor is not over the pan control button software object, or a release outside the button, or a situation where the cursor rolls out of the "hit" area of the pan control, transferring focus to another software object; this next code loop executes; focus is now transferred from the "sts" or "zst" frame loops back to the code based within this button software object;

>Stop Drag
global command to cease all drag functions;

>Set Property (High quality)="1"
instructs system to devote full resources to managing and maintaining the best video quality, now that scale and pan operations are no longer being executed;

>Set Variable: ". . . /:pani"=GetProperty(". . . /tzmr",_xscale)*.1
sets variable "pani" (pan increment) to a percentage of zoom layer 4 scale, 10% in this example; this number may be adjusted to change the sensitivity of the system to user input; setting the "pan increment" after scale and pan functions have ceased on this button release event allows this device to automatically poll the zoom layer 4 scale in anticipation of future pan layer 6 adjustment calls, enhancing apparent speed and the quality of interface response to future activity calls;

>Set Variable: "bu1"=GetTimer sets variable "bu1" (button up 1) to a number supplied by the system clock in milliseconds to use when sending focus to the scale or pan loops by comparing release to down state times regarding end user inputs;

>Set Property ("", X Position)=0 repositions the pan control button to its default position on the x axis of the device display;

>Set Property ("", Y Position)=0 repositions the pan control button to its default position on the y axis of the device display;

>Begin Tell Target (". . . /spot")

Goto and Stop ("h")

End Tell Target tell the software object "spot" one level up to goto frame "h" (hide) which shows no visible state scale and pan "que" objects;

>Goto and Stop ("ph")

sends this software object loop to a static frame "ph" (pan hold), where no code is executed; and >End On passes control to the display devices if the cursor is over the "hit" area of this button software object, to the "onRollOver" state of this button software object.

Illustratively, the pan control positions itself at the x=0/y=0 position in relation to the zoom layer 4 by default on roll-over of cursor 30 and on release of the mouse button events. This default positioning and repositioning of the pan control occurs during phases of the interactive use-cycle when no input initiates zoom or pan layers 4, 6 repositioning, and sets up a starting reference point (x=0/y=0) for this system to compare potential input to during the control layer 8 drag adjustments.

Because the invisible pan layer 6 and control layer 8 occupies an area greater than the viewable display area, it is available to respond to input at all cursor accessible points on the display device which are free of cursor focus usurping pan layer content. This feature allows hand, mouse, and cursor 30 movement to be minimized because the ubiquitous presence of the pan control in the control layer 8 is available universally (sans content) within the interface.

Pressing the mouse button while the cursor is actively over the pan control layer area triggers a code loop which analyzes zoom layer 4 scale and the distance the pan control layer button software object has been dragged from the x=0/y=0 position, and repositions the pan layer 6 on the zoom layer 4 multiple times a second in a recurring loop while the mouse button is depressed. Less powerful host systems may not be able to actually attain this smooth rate of loop repeats. This apparatus, however, may continue to operate correctly even at drastically reduced speeds, though smoothness of apparent interface adjustment may slow to a point where convenient usability is impaired.

Pan (Content) Layer

Data objects 10 or content may be incorporated in or imported into the pan layer 6 which may incorporate a content layer(s) that is/are positioned upon the pan layer 6, and may be visible through the display device to the user. Each data object 10 within the overall apparatus 2 may be the form of data of any type, as previously discussed, as well as including but not limited to: visual, audio, animated, static, or any combination of any translatable data type, including raster and vector-based data. It will be appreciated that the manner in which the content is imported to this layer is not restricted to any particular means. It is further appreciated that the content may be organized in any fashion that is relevant from both the visual and functional perspectives. For example, if the content is a plurality of relational databases, functionality may require the database to be organized on the content layer in such a way that provides logical interaction between the databases. Additionally, because the content exists on an infinite plane (i.e., pan layer 6), all of the databases may be displayed to the user concurrently for visual survey, browsing, or selective inspection and manipulation.

It is contemplated that apparatus 2 allows other controls to be used to place or import the data objects 10 on the pan layer 6, and adjust the scaled size of the placed data objects 10 so that the user may "pan and/or zoom" into selected data object(s) 10 to attain a comfortable view of same. Users may simply reduce the scale of individual objects to fit more on the data object 10, or develop a derivation to automatically calculate desired relative sizes between objects. Variable sizing or "antidrag-over blocking" of smaller, relatively scaled data objects 10 may enhance apparent depth as the static content held by the pan layer 6 is resized or repositioned via panning.

It is also appreciated that import and control of independent data objects 10 may illustratively be managed by an independent external file which is accessed by this apparatus 2, or managed by individual imported software objects that may set their own position as well as other settings within this apparatus 2.

Menu Layer

The upper layers hold user controls and static, animated or interactive content intended to be positioned above the pan layer 6. Such controls are placed above pan layer 6 because they are useful to the user regardless of any positioning of the pan and zoom layers or utilization of any content. It is contemplated that in one embodiment, the controls on the menu layer 16 always remain in the viewable area 12 of the display device 14. (See FIGS. 4 and 5.) Illustratively, such controls located on the menu layer 16 may comprise scroll bar reference point reset for both pan and scale control, navigation, background, location, help and full screen.

Scroll Bars

The scroll bars 17, 20, 22 are illustratively located on the menu layer 16 as previously mentioned. This allows for user access to the navigation controls in lieu of focus usurping content which may block cursor 30 access to the rear or bottom control layer 8. As is typical industry practice, the vertical scroll 22 may be located to the right of the viewable area 12, and the horizontal scroll 20 may be located on the bottom of the viewable area 12. An additional scaling function scroll bar scale control 17 may be added to the left of the viewable area 12. The scroll bars 17, 20, 22 may use the same code loops as the pan control system, with directional limitations placed on the boundaries of the drag operations of the scroll control buttons, which may be visible.

Illustratively, areas of upper layers without blocking objects (active-focus usurping objects) are transparent to the system, and underlying objects (buttons) may receive user focus (e.g., a cursor over button). Some objects on upper layers may also be visible to the user and transparent in terms of usurping focus, thus, allowing visibly-blocked objects (buttons) to respond to user input.

In addition to the object layer hierarchy, apparatus 2 comprises other features. These features include an internal window system that is located on a menu bar 24, illustratively located on the top portion of the viewable area 12. Other features included with apparatus 2 that can be included on the menu bar 24 may include a merge field, a quick center, an auto zoom, a reset, and antidrag-over blocking, wherein dimensionally smaller data objects 10 retain their x/y/z/ position with respect to the zoom/pan structure. The data objects do not reposition. Rather, they do get re-layered, smallest on top, closest to the user. These features expand the apparatus' capabilities, as well as provide a more flexible graphical interface.

Internal Window System

As previously discussed with regard to zoom layer 4, apparatus 2 may comprise a virtually unlimited number of individual "internal window systems" which can be placed on the pan layer 6 of the apparatus 2. Each internal window system is essentially a duplicate of the apparatus 2 placed on the pan layer 6 as another data object 10 to double the capabilities of apparatus 2 by creating a nested clone of itself. For example, a copy of apparatus 2 can be placed on the pan layer 6, such that a user may navigate the infinite space of apparatus 2 via its internal pan layer 6 and zoom layer 4 to find the clone of apparatus 2 identified in the figures as another data object 10, then navigate its infinite space via its pan layer 6 and zoom layer 4.

Merge Field

The "merge field" or "contain field" function allows each object holding internal window, as well as any sub-object internal window, to be apparently blended visually and interactively with the overall apparent three-dimensional space.

Illustratively, the entire internal window's display system is separated from the main pan layer 6 by a mask which blocks the boundaries of the internal window. When the confining mask is removed or greatly enlarged, the contents of the internal window's pan layer 6 are perceived to merge with the content of the pan layer 6. This perceived merged content may be repositioned and resized beyond the original boundaries of the internal window, though that content is still residing on the pan layer 6 of the internal window and still responsive to zoom layer 4 and pan layer 6 adjustments made to the internal window system's navigation controls.

Quick Reference

The quick reference control is a visible virtual software object that can be located on the menu layer 16. This control allows a single "click to center," or other specified reference point, such as that indicated by target 18 or center target 21, of any other point on the viewed field of pan layer 6 to be instantly centered upon the zoom layer 4 within the viewable area 12 of the display device 14 for closer inspection via the scaling function. Because the pan layer 6 may be of virtually unlimited x,y dimensions, when the zoom layer 4 is resealed, the pan layer 6 changes size proportionally. Repositioning the pan layer's 6 point of focus on the zoom layer 4 may, thus, be accomplished using this quick center or reference control.

Placing the quick reference control closest to the user on the menu layer 16 allows it to usurp cursor 30 focus over all data objects 10 and pan functions. Illustratively, employing the following steps with an input controller or mouse initiates the quick reference control. These illustrative steps are cursor rollover of the visible quick reference button software object to initiate automatic drag of the quick reference button, position the dragged quick reference button over the desired content, and press and release to move the content to the desired approximate reference position on the zoom layer 4. These actions reposition the data objects 10 selected to the approximate reference point of the viewing area 12 of the display device 14 where it may be enlarged or otherwise manipulated. A specific description of an illustrative quick center coding is as follows:

>Mouse On (Roll Over)
>Set Variable: "startposx"=GetProperty("",_x)
>Set Variable: "startposy"=GetProperty("",_y)
sets default position for reference in "on release" event;
>Start Drag (". . . /tqcb", lockcenter)
tells this button software object to lock itself to the cursor 30 (centered on the cursor) and follows the cursor 30 as it may be repositioned; this object is a visual "que" for the user, notifying same that the quick center system is activated;
>End On
this button object is now locked to and is staying with the mouse guided cursor;
>On (Press)
>Start Drag (". . . /tzmr/tmap/txonmap", lockcenter)
when the mouse button is pressed, drag is switched to another software virtual object "txonmap," which is located on the pan layer 6 and is invisible to the user, and is moved to a position coinciding with the present cursor 30 position; "txonmap" is a virtual software object located on, and is a sub-object of, the pan layer 6 and allows the user to define the spot on the pan layer 6 which will be repositioned to the center of the zoom layer 4 in the next lines of this code;
>End On
end of "press triggered" actions;
>On (release, release outside, roll out, drag over, drag out)
when mouse button is released;
Set Property (". . . /tzmr/tmap", X Position)=GetProperty (". . . /tzmr/tmap/txonmap",_x )*(−1)
sets the x position of the pan layer 6 (center point) to the x position of the software object "txonmap" as it relates to the zoom layer 4; additionally, the new pan layer 6 position called for is reversed by multiplying the new coordinate by "−1," which offsets the repositioned pan layer 6 so that the original location chosen by the user with the quick center button on the pan layer 6 is relocated to the center of the zoom layer 4;
>Set Property (". . . /tzmr/tmap", Y Position)=GetProperty
>(". . . /tzmr/tmap/txonmap",_y )*(−1)
same as "x" above, except the "y" axis is adjusted;
>Stop Drag
releases "txonmap" software object;
>Set Property ("", X Position)=startposx
>Set Property ("", Y Position)=startposy
returns the visible quick center control to its original docking position; and
>End On
ends quick center control code sequence.

Auto Zoom

Auto zoom, which can be a control function located on menu bar 26, combines the zoom layer 4 scaling with the pan layer 6 repositioning. The auto zoom control sets up a continuous scaling function using the same code loop as the pan control function loop labeled "zst," except the speed of the scaling remains constant even when the button is released. This allows the user to set any scaling rate desired. In this illustrative example, the zoom layer 4 maintains a constant scaling rate by default. In addition, the pan function loop is also activated and executed in a parallel form, allowing user-controlled vertical and horizontal pan layer 6 repositioning while the zoom layer 4 is scaling at a constant rate set by the user. It is contemplated, however, that the auto scaling function may be overridden by other pan or zoom commands also initiated by the user.

Zoom Reset

A "roll over reset" of the scaling function resets the zoom layer 4 scale to 1% when the zoom layer scale is larger than 29,000% and, conversely, to 29,000% when the zoom layer scale is smaller than 1%. This, too, can be a control function located on menu bar 26. Repositioning the pan layer 6 to new x and y coordinates on each "roll over and set new scale" event may be adjusted and controlled in a manner that it also automatically resets the pan layer 6 position to a new coordinate set (x,y or +/−x,y) so that upon each iterative loop of the "zoom roll over event," the pan layer 6 presents a different section of itself for viewing during the zoom execution. This results in an apparent infinite depth being available and yielding an impression that the z axis movement into or out of the interface is apparently unlimited and non-repeating.

Additionally, the scaling capacities of the apparatus seem to be unlimited because each iteration of the zoom roll over loop illustratively results in a new and different area of the pan layer 6 positioned within the bounds of the viewable area 12. Because the pan layer 6 is potentially infinite in size, there is no limit to the locations available for the visualized storage and interactive manipulation of different unique subsets of data objects 10. Each subsequent and sequential section of the pan layer 6 then appears to be a new depth level as the scaling function is progressively reset and the pan layer 6 is repositioned.

Drag-over Blocking

Repositionable and resizable data objects 10 may, on occasion, block the view of smaller scale data objects 10 when the stacking order of the content is arranged so that relatively smaller scale data objects 10, which appear to be farther from the user, are located on layers behind a larger, apparently closer, data object 10. (See FIG. 2.) Placing data objects 10 of various scales relative to other data objects 10 in the general vicinity of each other on pan layer 6 may create the illusion of enhanced depth (z axis) within the viewed area of this apparent three-dimensional system with viewable area 12.

This software device creates an apparent three-dimensional visual environment wherein larger and apparently closer data objects 10 do not block the view of smaller and apparently more distant data objects 10, thereby maintaining the user's sense of apparent geographic stability within the environment by arranging relatively positioned data objects 10 in a layered order with "apparently closer/larger" data objects 10 placed on layers farther from the user, and placing data objects 10 of an "apparently smaller size" on layers closer to the user in a mechanical structure. This results in apparently larger and closer data objects 10 not blocking smaller data objects 10 when those larger data objects 10 are moved or dragged in front of smaller data objects 10.

Interlayer Drag and Drop

Data object 10 manipulation via moving data objects from one pan layer 6 to another pan layer 6.

Multiple Visitor Interlink System

Multiple users accessing the apparatus from independent display devices may interlink and synchronize their display devices so that it appears that they are each seeing the same location on the pan layer at the same scaling level. In addition, it is contemplated that any party may be a designated "guide" and other display devices will then be set to coincidentally adjust the position of their respective pan and zoom layers to match those of the "guide." Furthermore, each individual user may, illustratively, authorize an "avatar" style icon which follows their cursor on the viewable and may be displayed in an approximately identical location on the other user's displays.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A computer-operated layered graphical content management interface, wherein a user can navigate to and view data objects by moving the data objects a perceived distance, either closer to or farther from the user, the layered graphical content management interface comprising:

a control layer;

a zoom layer; and a pan layer;

wherein at least one data object is located on the pan layer;

wherein the pan layer is located on the zoom layer such that the data object can be viewed by the user by scaling the zoom layer a perceived distance either closer to or farther from the user;

wherein the control layer provides scaling of the zoom layer and for scrolling of the pan layer; and wherein velocity of the scaling and scrolling varies relative to the perceived distance the data object is from the user, such that the velocity of scaling and scrolling is increased when the perceived distance between the data object and the user changes.

2. The interface of claim 1, wherein the at least one data object is a plurality of data objects stacked in order of relative size to prevent any one of the plurality of data objects from obstructing the user's view of any other of the plurality of data objects.

3. A computer-operated graphical content management interface, wherein a user can navigate to and view data objects, the graphical content management interface comprising:

a zoom layer; and a pan layer;

wherein at least one data object is located on the pan layer;

wherein the user navigates by scaling the zoom layer and scrolling the pan layer; and wherein velocity of the scaling and scrolling varies relative to the perceived distance the data object is from the user.

4. The interface of claim 3, wherein the velocity of scaling and scrolling is increased when the perceived distance between the data object and the user is large, and is decreased when the perceived distance between the data object and the user is small.

5. The interface of claim 3, wherein a copy of the interface can be imported into itself to provide a plurality of pan layers.

6. The interface of claim 3, wherein the pan layer is a perceived infinite space.

7. The interface of claim 3, wherein the plurality of data objects can visibly blend with each other.

8. The interface of claim 3, wherein input instructions from the user to the computer scales the zoom layer or scrolls the pan layer.

9. The interface of claim 3, wherein velocity of scaling further comprises repositioning dependencies for providing navigation of the pan layer.

10. The interface of claim 9, wherein the repositioning dependencies comprise a distance of control adjustment wherein scaling initiated by an input device affects scaling rate of the pan layer, and a velocity of control adjustment in association with the distance of control adjustment, wherein the velocity of the scaling is adjusted to compensate for the zoom layer's magnitude by defining a variable.

11. The interface of claim 10, wherein the scaling rate of the pan layer is exponential.

12. The interface of claim 10, wherein the variable is the product of an inverse ratio calculation of the zoom layer scale.

13. The interface of claim 3, wherein velocity of scrolling further comprises pan layer repositioning dependencies for providing navigation of the pan layer.

14. The interface of claim 13, comprising a distance of control adjustment wherein scrolling initiated by an input device affects a scrolling rate of the pan layer, a velocity of control adjustment in association with the distance of control adjustment, wherein the velocity of the scrolling is adjusted to compensate for the zoom layer's magnitude by defining a variable, and a scale of zoom wherein a pan increment modifies scrolling adjustments made to the pan layer based on the zoom layer's magnification.

15. The interface of claim 14, wherein scrolling initiated by the input device moves at an exponential rate.

16. The interface of claim 14, wherein the variable is the product of an inverse ratio calculation of the zoom layer scale.

17. The interface of claim 14, wherein the pan increment magnifies scrolling adjustments to the pan layer when the scale of the zoom layer is reduced, and reduces scrolling adjustments to the pan layer when the scale of the zoom layer increased.

18. The interface of claim 3, wherein the at least one data object is an executable program.

19. The interface of claim 3, further comprising a menu layer having zoom and scrolling functions located thereon and accessible to the user regardless of data object positioning.

20. The interface of claim 3, wherein the pan layer is a perceived infinite space.

21. The interface of claim 20, wherein the at least one data object is an executable program.

* * * * *